(12) United States Patent
Follingstad

(10) Patent No.: US 7,244,144 B2
(45) Date of Patent: *Jul. 17, 2007

(54) TELECOMMUNICATIONS PATCH PANEL WITH ANGLED CONNECTOR MODULES

(75) Inventor: Michael Jay Follingstad, Edina, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 51 days.

This patent is subject to a terminal disclaimer.

(21) Appl. No.: 11/112,139

(22) Filed: Apr. 22, 2005

(65) Prior Publication Data

US 2005/0191901 A1  Sep. 1, 2005

Related U.S. Application Data

(63) Continuation of application No. 10/349,800, filed on Jan. 22, 2003, now Pat. No. 6,916,199, which is a continuation of application No. 09/092,545, filed on Jun. 5, 1998, now Pat. No. 6,537,106.

(51) Int. Cl.
*H01R 13/518* (2006.01)

(52) U.S. Cl. .................................. 439/534; 439/540.1

(58) Field of Classification Search ................ 439/344, 439/941, 676, 535, 540.1, 541.4, 534
See application file for complete search history.

(56) References Cited

U.S. PATENT DOCUMENTS

| | | | |
|---|---|---|---|
| 1,616,114 A | 2/1927 | Curran et al. | |
| 2,317,450 A | 4/1943 | Folds et al. | |
| 2,427,349 A | 9/1947 | Boynton | |
| 3,337,059 A | 8/1967 | Le Hoy | |
| 3,611,264 A | 10/1971 | Ellis, Jr. | |
| 3,915,541 A | 10/1975 | Flegel | |
| 3,953,100 A | 4/1976 | Feeney | |
| 3,958,850 A | 5/1976 | Ayer | |
| 4,085,992 A | 4/1978 | Ayer | |
| D247,965 S | 5/1978 | Gray | |
| 4,131,330 A | 12/1978 | Stupay | |
| D271,965 S | 12/1983 | Hollfelder | |

(Continued)

FOREIGN PATENT DOCUMENTS

EP   0 736 937 A1   10/1996

OTHER PUBLICATIONS

Articles from "BISCINEWS" re PerfectPatch™, vol. 17, No. 6, Jan., 1997; vol. 17, No. 7, Feb., 1997; and vol. 17, No. I, Apr., 1997, 16 pages.

(Continued)

*Primary Examiner*—Briggitte R. Hammond
(74) *Attorney, Agent, or Firm*—Merchant & Gould, P.C.

(57) ABSTRACT

A telecommunications patch panel is provided having a plurality of connector modules rotatably mounted to a frame member. Each connector module has a front face and an opposite facing rear face, and each front face includes a plurality of connector jacks. Each rear face includes a plurality of wire termination blocks. The wire termination blocks are electrically connected to the connector jacks. Each connector module is rotatable about a rotation axis relative to the frame member. A lock selectively locks each connector module to the frame member as desired. The connector jacks and the connector modules are arranged in linear arrays perpendicular to the axis of rotation.

12 Claims, 12 Drawing Sheets

U.S. PATENT DOCUMENTS

| | | | |
|---|---|---|---|
| 4,536,052 A | 8/1985 | Baker et al. | |
| 4,747,020 A | 5/1988 | Brickley et al. | |
| 4,815,104 A | 3/1989 | Williams et al. | |
| 4,824,196 A | 4/1989 | Bylander | |
| 4,995,688 A | 2/1991 | Anton et al. | |
| 5,000,703 A | 3/1991 | Biederstedt et al. | |
| 5,011,257 A | 4/1991 | Wettengel et al. | |
| 5,127,082 A | 6/1992 | Below et al. | |
| 5,129,842 A | 7/1992 | Morgan et al. | |
| 5,139,445 A | 8/1992 | Below et al. | |
| 5,178,554 A | 1/1993 | Siemon et al. | |
| 5,238,426 A | 8/1993 | Arnett | |
| 5,299,956 A | 4/1994 | Brownell et al. | |
| 5,302,140 A | 4/1994 | Arnett | |
| 5,303,519 A | 4/1994 | Mustee et al. | |
| 5,310,363 A | 5/1994 | Brownell et al. | |
| 5,370,541 A | 12/1994 | Bossard | |
| 5,370,553 A | 12/1994 | Zimmerman | |
| RE34,955 E | 5/1995 | Anton et al. | |
| 5,412,751 A | 5/1995 | Siemon et al. | |
| 5,415,296 A | 5/1995 | Wright | |
| D367,037 S | 2/1996 | Fladung et al. | |
| 5,530,954 A | 6/1996 | Larson et al. | |
| 5,575,665 A | 11/1996 | Shramawick et al. | |
| 5,591,045 A | 1/1997 | Pepe et al. | |
| 5,639,261 A | 6/1997 | Rukowski et al. | |
| 5,645,449 A | 7/1997 | Sabo | |
| 5,659,650 A | 8/1997 | Arnett | |
| 5,674,093 A | 10/1997 | Vaden | |
| 5,676,566 A | 10/1997 | Carlson | |
| 5,700,167 A | 12/1997 | Pharney et al. | |
| 5,721,394 A | 2/1998 | Mulks | |
| 5,734,776 A | 3/1998 | Puetz | |
| 5,735,714 A | 4/1998 | Orlando et al. | |
| 5,778,130 A | 7/1998 | Walters et al. | |
| 5,788,087 A | 8/1998 | Orlando | |
| 5,836,786 A | 11/1998 | Pepe | |
| 5,888,079 A | 3/1999 | Norden | |
| 5,892,870 A | 4/1999 | Fingler et al. | |
| 5,921,402 A | 7/1999 | Magenheimer | |
| 5,944,535 A | 8/1999 | Bullivant et al. | |
| 5,945,633 A | 8/1999 | Ott et al. | |
| 5,947,765 A | 9/1999 | Carlson, Jr. et al. | |
| 5,956,449 A | 9/1999 | Otani et al. | |
| 5,969,294 A | 10/1999 | Eberle et al. | |
| 5,984,720 A | 11/1999 | Milner et al. | |
| 5,993,251 A | 11/1999 | Brown et al. | |
| 6,146,192 A | 11/2000 | Cabalka et al. | |
| 6,200,159 B1 | 3/2001 | Chou | |
| 6,208,796 B1 | 3/2001 | Vigliaturo | |
| 6,231,380 B1 | 5/2001 | Cabalka et al. | |
| 6,236,795 B1 | 5/2001 | Rodgers | |
| 6,240,234 B1 | 5/2001 | Falkenberg et al. | |
| 6,242,698 B1 | 6/2001 | Baker, III et al. | |
| 6,259,852 B1 | 7/2001 | Daoud et al. | |
| 6,293,707 B1 | 9/2001 | Wild | |
| RE37,489 E | 1/2002 | Anton et al. | |
| 6,350,148 B1 | 2/2002 | Bartolutti et al. | |
| 6,468,112 B1 | 10/2002 | Follingstad et al. | |
| 6,497,578 B1 | 12/2002 | Kwong et al. | |
| 6,522,548 B1 | 2/2003 | Duggan et al. | |
| 6,537,106 B1 | 3/2003 | Follingstad | |
| 6,565,260 B2 | 5/2003 | Belaidi et al. | |
| 6,600,106 B2 | 7/2003 | Standish et al. | |
| 6,614,978 B1 | 9/2003 | Caveney | |
| 6,692,284 B1 | 2/2004 | Koh | |
| 6,711,339 B2 | 3/2004 | Puetz et al. | |
| 6,866,541 B2 | 3/2005 | Barker et al. | |
| 6,902,429 B1 | 6/2005 | Brooks | |
| 6,916,199 B2 | 7/2005 | Follingstad | |
| 6,916,213 B2 | 7/2005 | Nyblin et al. | |
| 6,918,786 B2 | 7/2005 | Barker et al. | |
| 6,971,909 B2 | 12/2005 | Levesque et al. | |
| 6,981,893 B2 | 1/2006 | Barker et al. | |
| 2003/0129871 A1 | 7/2003 | Follingstad | |
| 2004/0209515 A1 | 10/2004 | Caveney et al. | |
| 2005/0142910 A1 | 6/2005 | Levesque et al. | |
| 2005/0142932 A1 | 6/2005 | Levesque et al. | |
| 2005/0185912 A1 | 8/2005 | Levesque et al. | |
| 2005/0233635 A1 | 10/2005 | Denovich et al. | |
| 2005/0233647 A1 | 10/2005 | Denovich et al. | |

OTHER PUBLICATIONS

Hubbell catalog, front cover page, pp. 4, 31, 60, 61, and back cover page.

Leviton Telcom catalog, front cover page, pp. D2 through D5, and back cover page, dated 1995.

PerfectPatch™, brochure, 4 pages.

AT&T Patchmax™, instruction sheets, 6 pages, dated Jan., 1996.

NORDX/CDT brochure entitled "IBDN enhanced Connectivity," 4 pages, dated 1997.

Panduit® catalog, front cover page, pp. 5, 7, 8, 19, 59 through 67, and back cover page, dated 1996.

1996 anixter catalog, front cover, pp. 1-6, 1-7, 1-20 through 1-24, 1-47, 1-48a, 1-49, 1-51, 1-80a. 1-129. 1-138, 1-161, 1-184, and back cover page, dated 1996.

The Siemon Company Catalog 1997, front cover page, pp. 2-1 through 2-9, 2-18, 2-19, 14-6, and back cover page, dated 1997.

1997 Nordx/CDT catalog entitled "IBDN Catalog and Reference Guide," front cover page, pp. 5-21 through 5-29, and back cover page, Oct. 1996.

Lucent Technologies catalog entitled "SYSTTIMAX® Structured Connectivity Solutions," front cover page, pp. 3-25 through 3-36 dated Jan. 1998.

Exhibit A Articles from "BISCINEWS" re PerfectPatch™, vol. 17, No. 6, Jan., 1997; vol. 17, No. 7, Feb., 1997; and vol. 17, No. 8, Apr., 1997, 16 pages.

Exhibit B Hubbell catalog, front cover page, pp. 4, 31, 60, 61, and back cover page.

Exhibit C Leviton Telcom catalog, front cover page, pp. D2 through D5, and back cover page, dated 1995.

Exhibit D PerfectPatch™ brochure, 4 pages.

Exhibit E AT&T Patchmax™ instruction sheets, 6 pages, dated Jan., 1996.

Exhibit F NORDX/CDT brochure entitled "IBDN Enhanced Connectivity," 4 pages, dated 1997.

Exhibit G Panduit® catalog, front cover page, pp. 5, 7, 8, 19, 59 through 67, and back cover page, dated 1996.

Exhibit H 1996 Anixter catalog, front cover, pp. 1-6, 1-7, 1-20 through 1-24, 1-47, 1-48a, 1-49, 1-51, 1-80a, 1-129, 1-138, 1-161, 1-184, and back cover page, dated 1996.

Exhibit I The Siemon Company Catalog 1997, front cover page, pp. 2-1 through 2-9, 2-18, 2-19, 14-6, and back cover page, dated 1997.

Exhibit J 1997 Nordx/CDT catalog entitled "IBDN Catalog and Reference Guide," front cover page, pp. 5-21 through 5-29, and back cover page, Oct. 1996.

Exhibit K Lucent Technologies catalog entitled "SYSTIMAX® Structured Connectivity Solutions," front cover page, pp. 3-25 through 3-36 dated Jan., 1998.

Exhibit 1 Brief entitled "Telect's Reply Brief Re Claim Interpretation," submitted in *Telect, Inc. v. ADC Telecommunications, Inc.*, Civil No. 97-1732 (DSD/JMM). The brief, signed by Telect's attorney on Jan. 19, 1998, includes at Exhibits A-C drawings of hypothetical fiber optic connector cabinets. The drawings of Exhibits A-C were used to illustrate attorney arguments made by Telect.

Exhibit 2 Document, entitled "Telect's Revised Proposed Order," submitted to the Court by Telect along with the above brief of Exhibit 1. This document includes at Exhibits A-C the same hypothetical drawings discussed above. This document was filed with the Court with Exhibit 1.

Exhibit 3 Document, entitled "Telect's Responses to ADC's Second Set of Document Requests," served by Telect in response to ADC's document requests. Telect's responses were signed by Telect's attorneys on Feb. 6, 1998 and Feb. 9, 1998.

www.panduit.com/products, Panduit Product Information, Copyright 1995-2003, 2 pages.

DP6 Plus Angled Patch Panel Customer Drawing.

Panduit product literature, DP6 PLUS Patch Panels.

Panduit product literature, DP6 PLUS Component Test Data.

Ortronics product literature, The Complete Guide to Structured Cabling Systems, 1999, 2 pages.

Ortronics product literature, 1997-98 Full Line System Solutions Catalog, 2 pages.

Exhibit A: "Complaint," ADC Telecommunications, Inc. v. CommScope Solutions Properties, LLC and CommScope Solutions, Inc., District of Minnesota, Civil Action No. 0:05-cv-02584 ADM-JSM, pp. 1-10 (Nov. 7, 2005).

Exhibit B: "Answer and Counterclaims," ADC Telecommunications, Inc. v. CommScope Solutions Properties, LLC and CommScope Solutions, Inc., District of Minnesota, Civil Action No. 0:05-cv-02584 ADM-JSM, pp. 1-16 (Dec. 29, 2005).

Exhibit C: "ADC's Reply and Counterclaims to Defendant's Counterclaims," ADC Telecommunications, Inc. v. CommScope Solutions Properties, LLC and CommScope Solutions, Inc., District of Minnesota, Civil Action No. 0:05-cv-02584 ADM-JSM, pp. 1-10 (Feb. 17, 2006).

Exhibit D: "First Amended Complaint," ADC Telecommunications, Inc. and ADC GMBH v. CommScope Soutions Properties, LLC and CommScope Solutions, Inc., District of Minnesota, Civil Action No. 0:05-cv-02584 ADM-JSM, pp. 1-12 (Apr. 19, 2006).

Exhibit E: "Answer and Counterclaims to First Amended Complaint," ADC Telecommunications, Inc. and ADC GmbH v. CommScope Solutions Properties, LLC and CommScope Solutions, Inc., District of Minnesota, Civil Action No. 0:05-cv-02584 ADM-JSM, pp. 1-17 (Apr. 28, 2006).

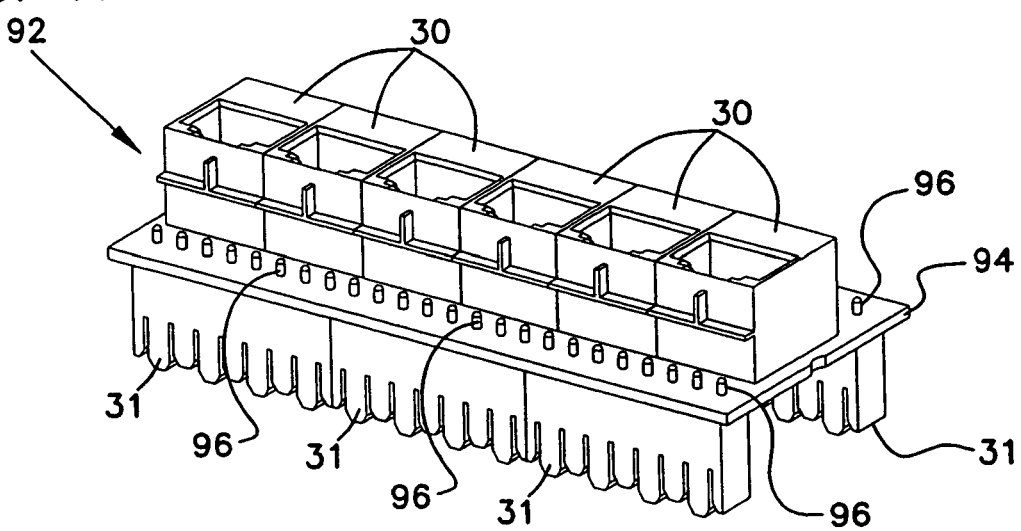

TELECOMMUNICATIONS PATCH PANEL WITH ANGLED CONNECTOR MODULES

CROSS-REFERENCE TO RELATED APPLICATIONS

This application is a continuation of application Ser. No. 10/349,800, filed Jan. 22, 2003 now U.S. Pat. No. 6,916,199; which is a continuation of application Ser. No. 09/092,545, filed Jun. 5, 1998, now U.S. Pat. No. 6,537,106; which applications are incorporated herein by reference.

FIELD OF THE INVENTION

The present invention relates to a telecommunications connecting panel and, more particularly, to a cross-connect patch panel including a frame with jacks on one side and wire termination locations on an opposite side.

BACKGROUND OF THE INVENTION

Local area networks and telecommunications connections often use patch panels, especially at the customer's premises to enable cross-connection between telecommunications equipment. Patch panels typically include front and rear connection locations. The rear connections are typically a more permanent type of connection, such as insulation displacement connectors to connect to copper based, twisted pair telecommunications cable. The front connections of the patch panel may include any of a variety of jacks for receipt of a plug of a patch cord or other transmission cable. The jack and plug allows fairly rapid connection and disconnection between two jacks in the same patch panel, or between one jack in the patch panel and another jack in a nearby patch panel, with the patch cord. One type of jack and plug arrangement for a patch panel is an RJ45 type connector. U.S. Pat. No. 5,639,261 is an example of a cross-connect panel including rear insulation displacement connectors, and front connector jacks for receiving plugs of patch cords.

There is an increasing need for cable management in order to protect and organize the various cables. One area where damage and/or loss of performance may occur with copper based, twisted pair cables is when excessive bending of the cable occurs. This is especially a concern as higher frequencies are used, such as category 5 and greater. Falling below minimum bend radii of the cables can adversely affect performance with the transmission of signals through the copper wire patch cords. Therefore, there is a need for patch panels which address the cable management concerns noted above.

SUMMARY OF THE INVENTION

A telecommunications patch panel according to one aspect of the invention includes a connector module, and a frame member for mounting the connector module. The connector module includes a connector jack along a front face. A rear face includes a connection location for connecting to a conductive wire or other transmission cable. Each connector module defines an axis of rotation relative to the frame member generally parallel to the front face. The connector module is positionable in one of three positions, a parallel position to the frame member, a first angled position relative to the frame member, and a second angled position relative to the frame member where the second angled position is in an opposite direction to the first angled position.

A plurality of connector modules in at least one linear array are preferably provided. Preferably, a plurality of connector jacks are provided on each connector module. The connector jacks are preferably arranged in linear arrays generally perpendicular to each axis of rotation of the connector module or modules. Locks are provided to lock the connector modules to the frame member in one of the selected positions.

According to another aspect of the present invention, a telecommunication patch panel includes a plurality of connector modules including linear arrays of connector jacks with each jack connected to a wire termination block. The connector modules are mounted to a frame member where each of the linear arrays of connector jacks is positioned at an angle relative to a front face of the frame member.

BRIEF DESCRIPTION OF THE DRAWINGS

FIG. 17 is a rear perspective view of the circuit module of the connector module of FIG. 11.

DETAILED DESCRIPTION OF THE PREFERRED EMBODIMENT

Figure 1:
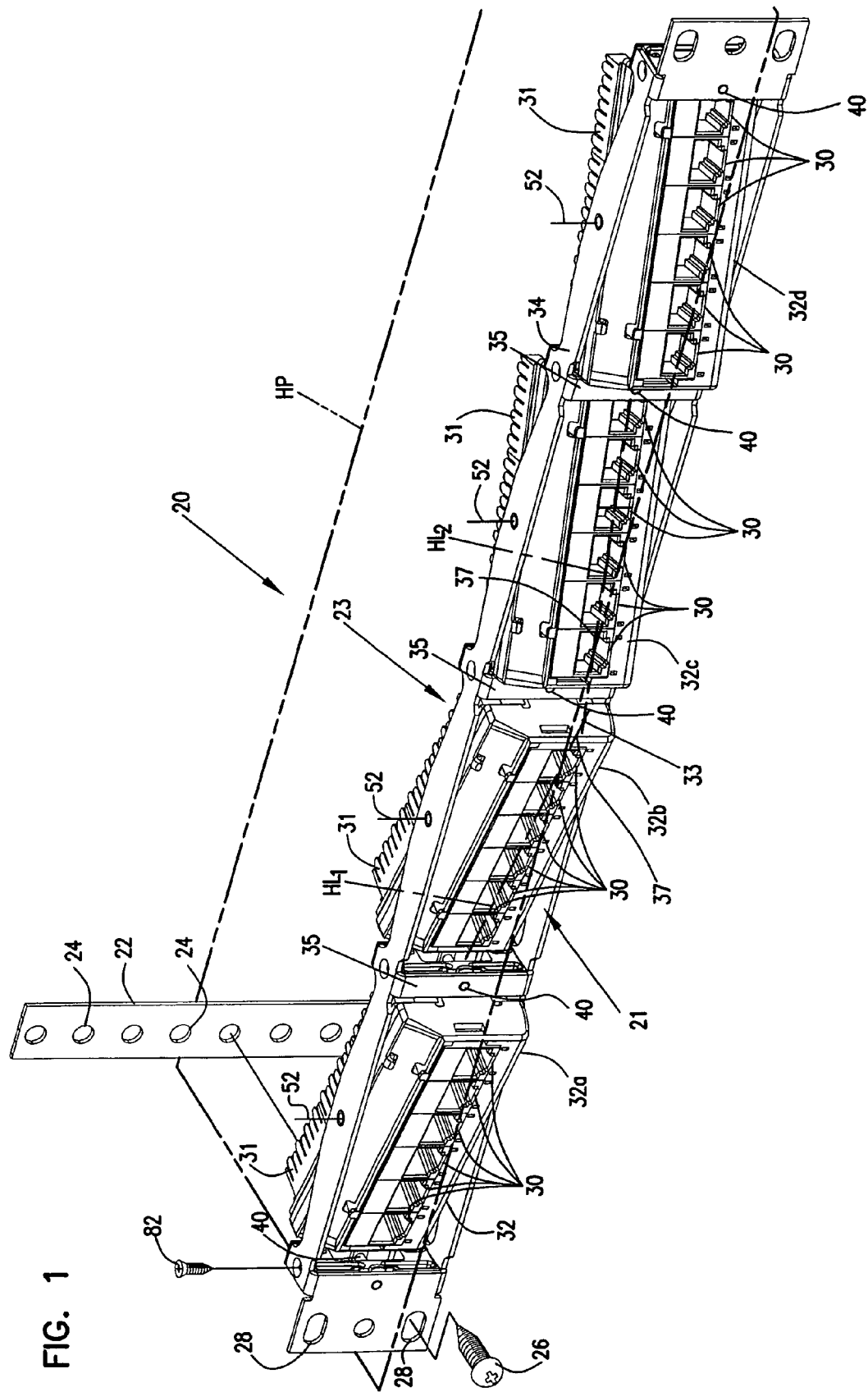
FIG. 1 is an exploded perspective view of an embodiment of a patch panel and a portion of a rack for holding the patch panel in accordance with the present invention, with two connector modules angled to the left and two connector modules angled to the right when the panel is mounted to the rack horizontally.
Figure 2:
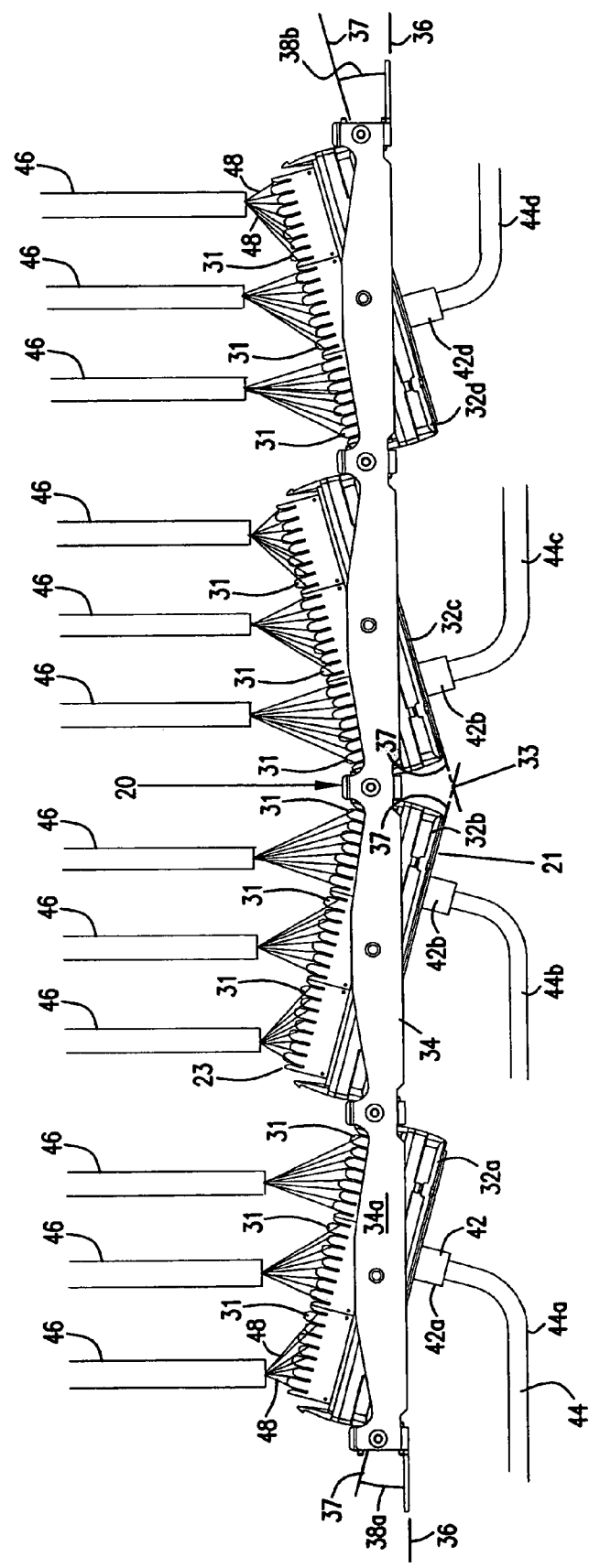
FIG. 2 is a top view of the patch panel of FIG. 1, showing front and rear connections to cables.

Referring now to FIGS. 1 and 2, an embodiment of a patch panel 20 is shown for use in connecting telecommunications equipment. Patch panel 20 is especially useful to cross-connect equipment through one or more of patch panels 20 or other panels. Patch panel 20 mounts to a rack 22 of conventional construction, such as with fasteners 26 passing through holes 28 of patch panel 20 for receipt in holes 24 of rack 22. Patch panel 20 includes a plurality of connector jacks 30, such as RJ45 connector jacks, on a front side 21. Patch panel 20 further includes a plurality of connection locations 31, such as wire termination or connection blocks 31 mounted on an opposite rear side 23. Preferably, termination blocks 31 include 110 type insulation displacement connectors. Termination blocks 31 allow for connection of signal transmission cables 46, each containing a plurality of conductive wires 48. Connector jacks 30 allow for connection of signal transmission patch cables or cords 44 including conductive wires and further including connector end plugs 42. Circuitry electrically connects each termination block 31 to a connector jack 30.

Patch panel 20 includes a plurality of connector modules 32, where each connector module 32 includes a plurality of connector jacks 30. The connector modules 32 of patch panel 20 are arranged in a linear array. Each connector module 32 includes a linear array (e.g., a row) of connector jacks 30. One linear array of jacks 30 is shown per connector module 32. Two or more arrays could be provided. Alternative embodiments include patch panels 20 with a single connector module 32. Also, each connector module 32 may be constructed with a single connector jack 30. As shown in FIG. 1, all of the connector modules 32 are shown aligned along a horizontal plane HP. and the jacks 30 of the middle connector modules 32b, 32c are aligned along horizontal lines $HL_1$, $HL_2$ that intersect at a location 33 positioned in front of the frame 34. As shown in FIGS. 1 and 2, the frame 34 includes front spacers 35 that separate the modules 32a, 32b, 32c and 32d from one another.

As shown in FIGS. 1 and 2, each connector module 32 is mounted in an angled orientation relative to frame 34. Specifically, frame 34 includes a front plane or face 36, and each connector module 32 includes a front plane or face 37 where each front face 37 of the connector modules 32 is at an angle relative to front face 36 of frame 34. Connector modules 32a, 32b are angled to the left of frame 34, and connector modules 32c, 32d are angled to the right. Alternatively stated, connector modules 32a, 32b are angled clockwise, and connector modules 32c, 32d are angled counterclockwise, as viewed from a top of frame 34 as depicted in FIG. 2. As shown at FIG. 2, the plane 37 defined by module 32b intersects with the plane 37 defined by module 32c at an intersection location positioned in front of the frame 34. As shown in FIG. 2, the angled relationship between the modules 32b and 32c provides a generally v-shaped front connection interface defined by the rows of front connectors 30. and a generally v-shaped rear connection interface defined by the connection locations 31. If patch panel 20 was oriented vertically, then connector module 32a, 32b would be angled upwardly (or downwardly), and connector modules 32c, 32d would be angled downwardly (or upwardly).

In the illustrated preferred embodiment, the angle of displacement of each connector module 32 relative to frame 34 is about 15 degrees. In the case of patch cords 44a, 44b angled to the left, and patch cords 44c, 44d angled to the right, such an angle provides strain relief so as to help prevent cable damage and/or loss of cable performance. The cable positioning provided by the angled connector modules 32 helps reduce the likelihood of falling below the minimum bend radius of the cable as each cable travels to other jacks or other equipment. Such strain relief is advantageous over a perpendicular mounting of the connector plug relative to the cable pathway, such as illustrated in FIG. 4.

Figure 3:
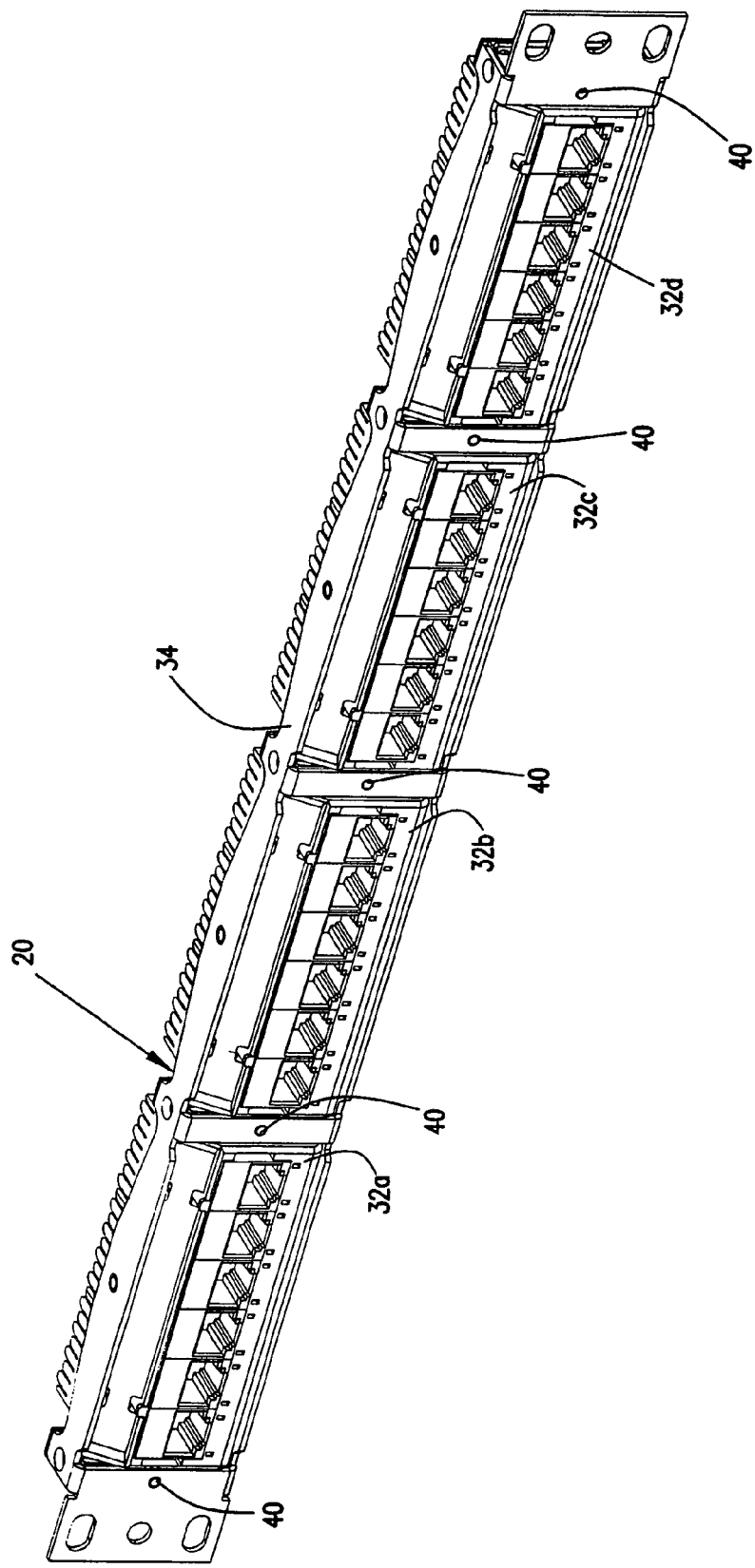
FIG. 3 is a perspective view of the patch panel of FIG. 1, showing all of the connector modules extending parallel to the frame.
Figure 4:
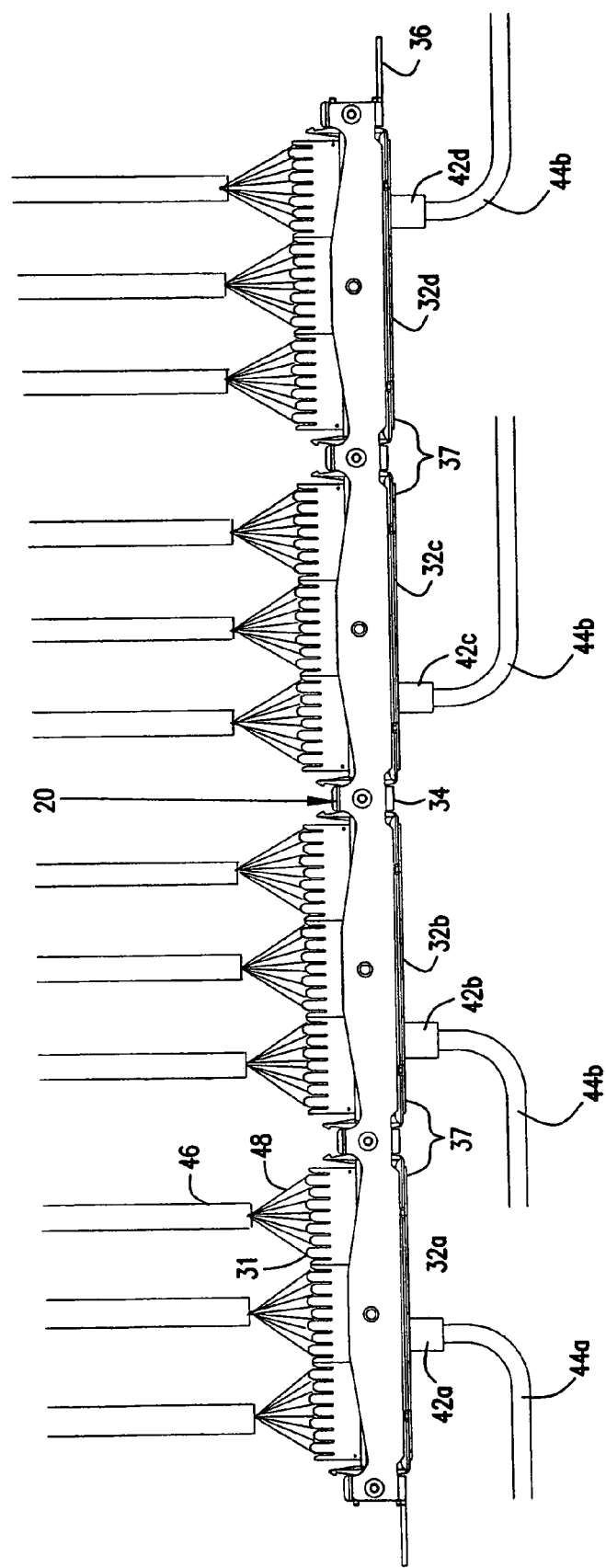
FIG. 4 is a top view of the patch panel of FIG. 3, showing front and rear connections to cables.
Figure 5:
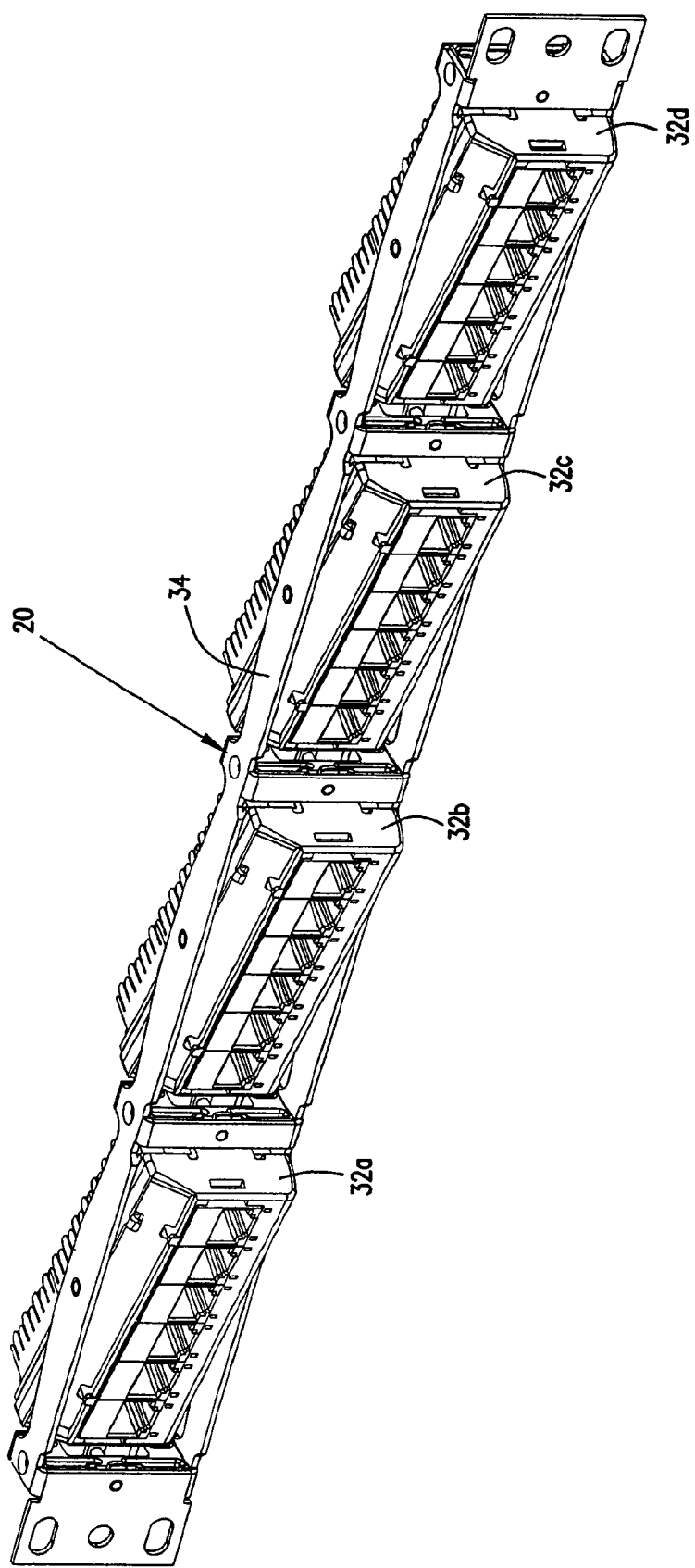
FIG. 5 is a perspective view of the patch panel of FIG. 1, showing all of the connector modules angled to the left side of the frame.
Figure 6:
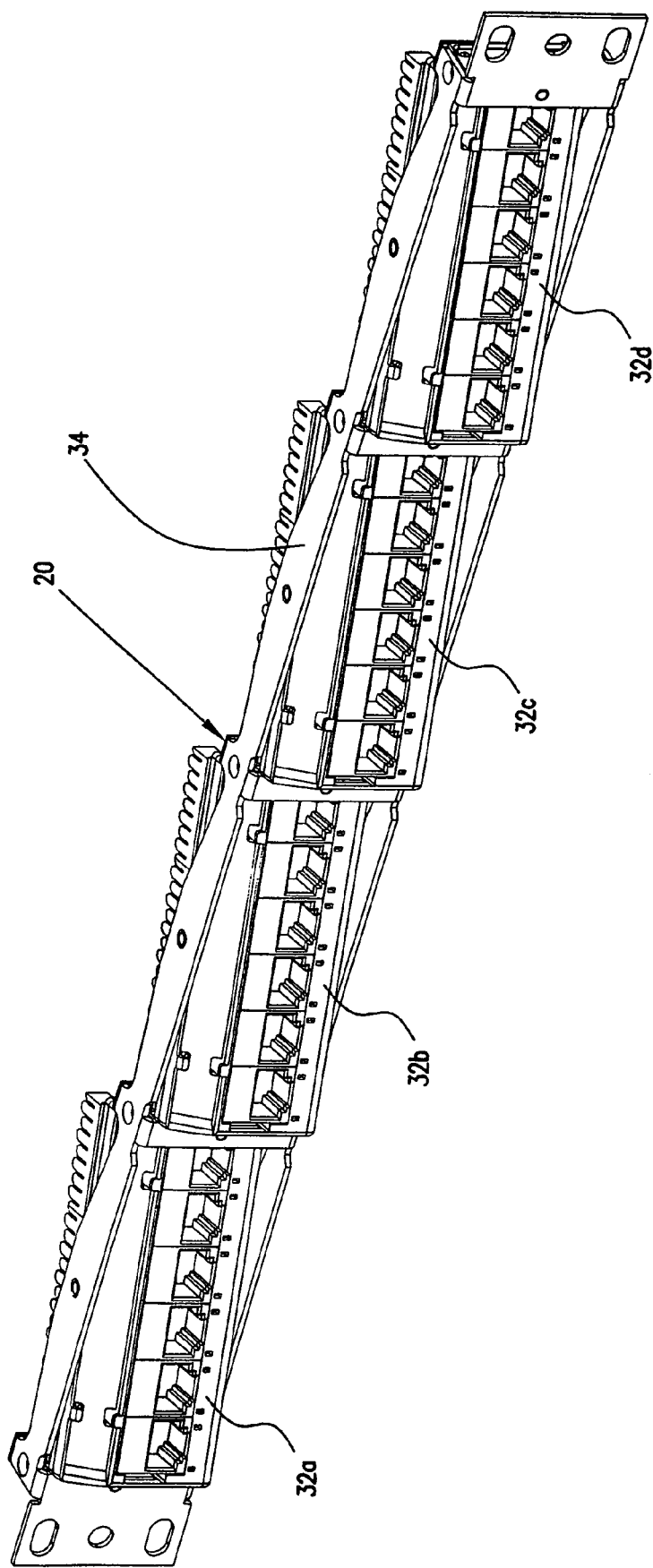
FIG. 6 is a perspective view of the patch panel of FIG. 1, showing all of the connector modules angled to the right side of the frame.
Figure 7:
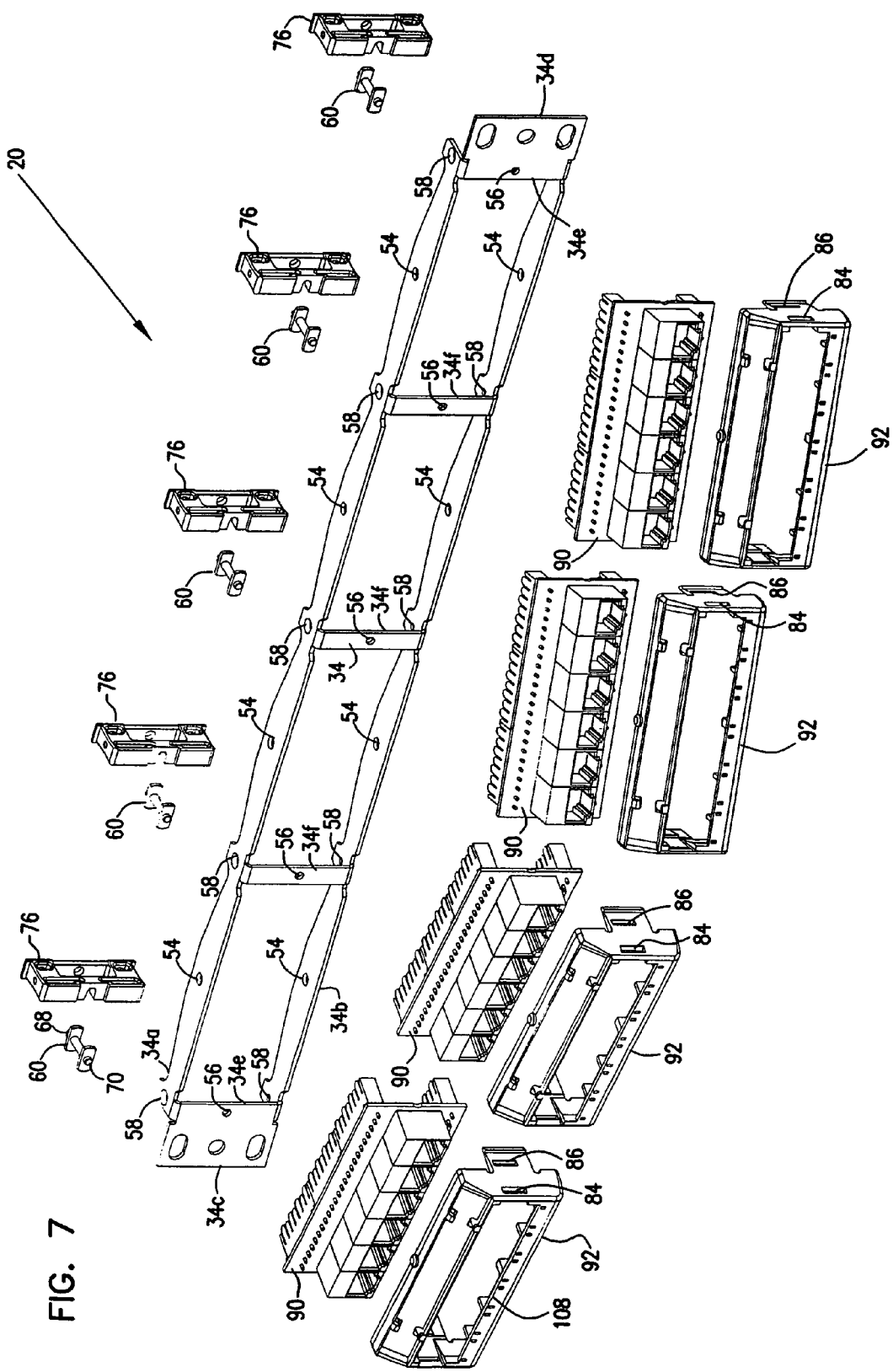
FIG. 7 is an exploded perspective view of the patch panel of FIG. 1.
Figure 8:
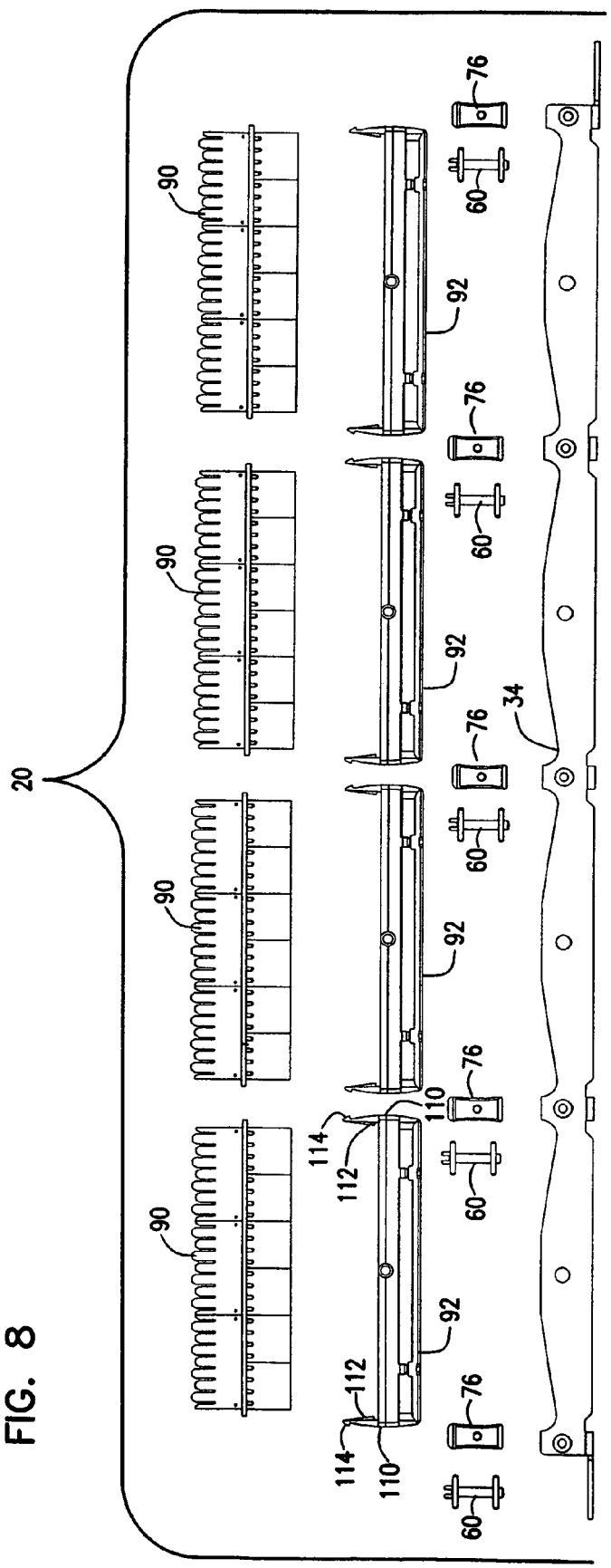
FIG. 8 is an exploded top view of the patch panel of FIG. 1.
Figure 9:
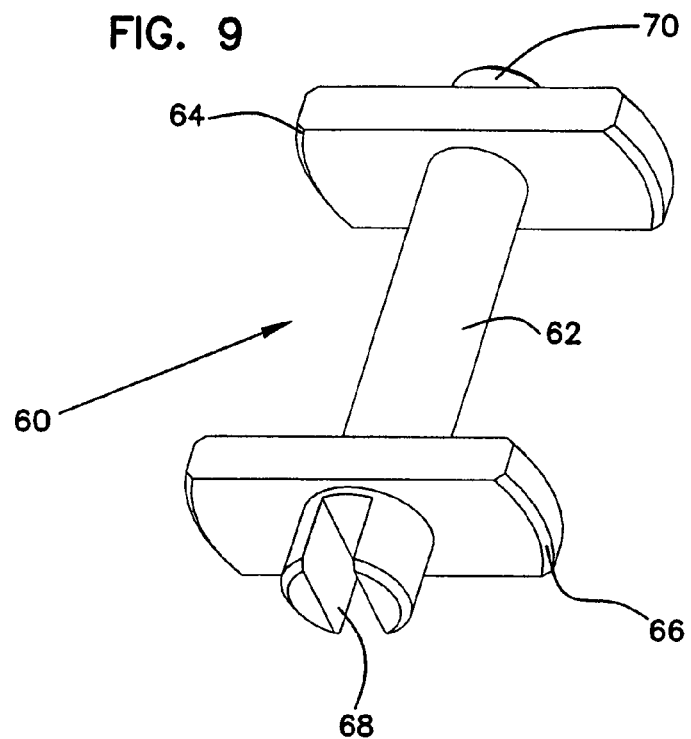
FIG. 9 is a rear perspective view of the locking pin of the patch panel of FIG. 1.
Figure 10:
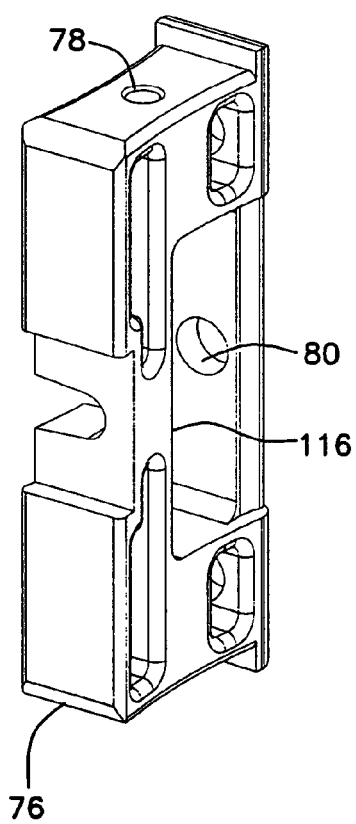
FIG. 10 is a perspective view of the bracket of the patch panel of FIG. 1.
Figure 11:
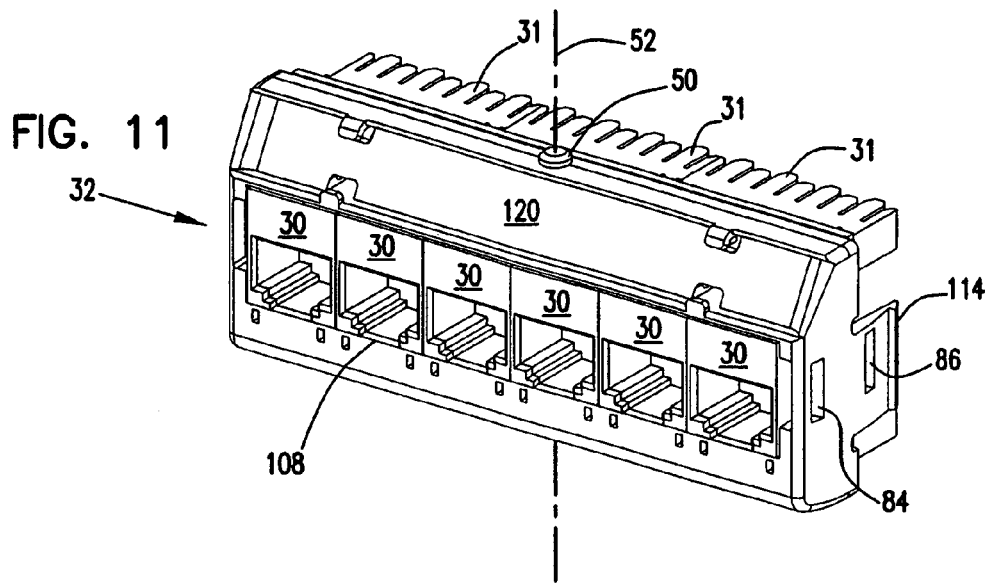
FIG. 11 is a perspective view of the connector module of the patch panel of FIG. 1.
Figure 12:
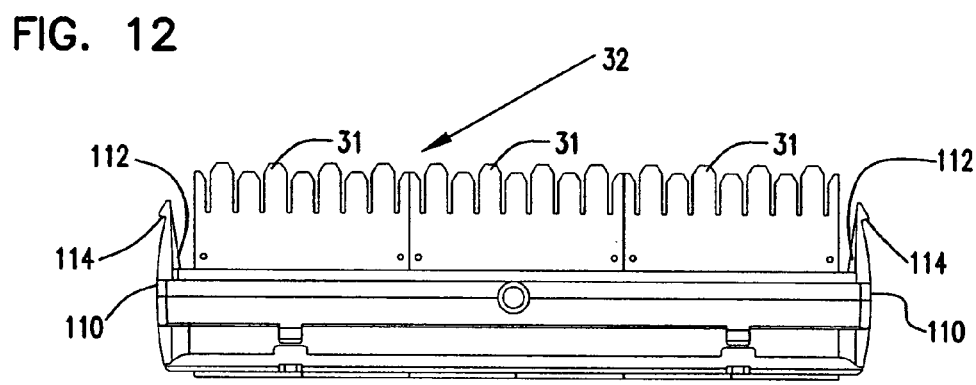
FIG. 12 is a top view of the connector module of FIG. 11.
Figure 13:
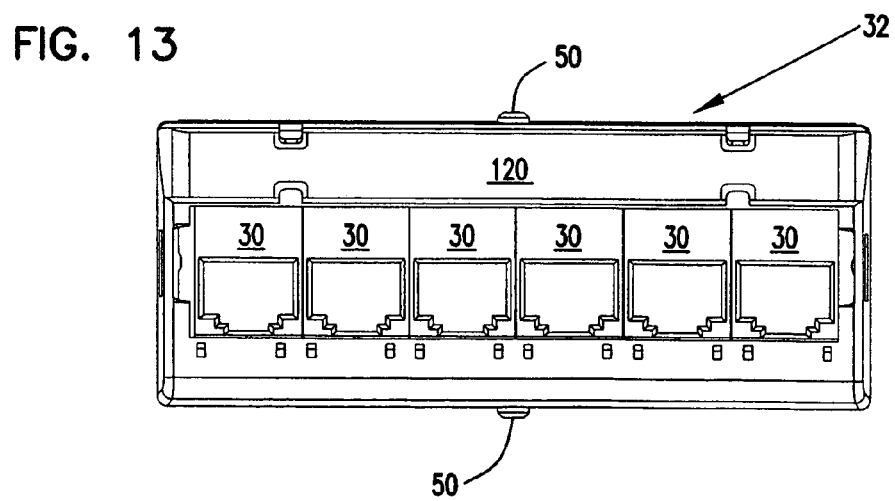
FIG. 13 is a front view of the connector module of FIG. 11.
Figure 14:
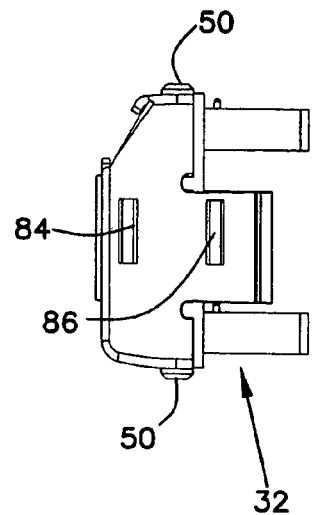
FIG. 14 is a side view of the connector module of FIG. 11, an opposite side being a mirror image.

FIGS. 3 and 4 are provided to illustrate advantageous features of patch panel 20 in accordance with the invention. Preferably, connector modules 32 are rotatable relative to frame 34. In FIGS. 3 and 4, each connector module 32 has its front face 37 positioned generally parallel to front face 36 of frame 34. Such an arrangement is useful when using a termination tool (not shown) to mount wires 48 to each of termination blocks 31 in the case of insulation displacement connectors. A lock 40, shown generally in FIGS. 1 and 2, holds each connector module 32 to frame 34 during the termination operation. Lock 40 is releasable to allow rotation of each connector module 32 as desired. As shown in FIGS. 1 and 2, connector modules 32a, 32b are rotated to the left, and connector modules 32c, 32d are rotated to the right. One or more connector modules 32 can be left in the positions shown in FIGS. 3 and 4, if desired. Alternatively, all the connector modules 32 can be rotated to the left as shown in FIG. 5, or to the right as shown in FIG. 6. To maintain the connector modules in the rotated positions, lock 40 is reactivated. If desired, one or more of the connector modules 32 and frame 34 can be constructed in a permanently angled configuration relative to front face 36 frame 34.

In FIGS. 2 and 4, cables 44 are shown as being directed away from patch panel 20. It is to be noted that the opposite ends of cables 44 can be connected to other connector jacks 30 of patch panel 20. Also, patch panel 20 is useable in both cross-connect systems, and in inter-connect systems, as desired. Providing strain relief so as to not fall below minimum bend radii is also an issue with fiberoptic transmission cables. The telecommunications patch panel 20 of the present invention is also useful in fiber applications with appropriately configured fiberoptic connectors.

Lock 40 is a preferred feature for patch panel 20. However, a patch panel 20 where the lock is not activated, or a patch panel 20 where no lock is present are both advantageous arrangements. In those instances, each connector module 32 is positionable to the left (fully or partially), to the right (fully or partially) or parallel as desired. For connector modules which are freely rotatable, the modules 32 may move to a new position from an original position to provide the strain relief, as the patch cords 44 are added or changed.

Referring now to FIGS. 7 through 17, additional details of patch panel 20 are shown. Each connector module 32 includes pins 50 extending in opposite directions and defining a rotation axis 52 (see FIG. 11). Each rotation axis 52 is generally perpendicular to the linear array defined by connector jacks 30. Pins 52 are received in holes 54 of frame 34. The rotatable mounting of each connector module 32 to frame 34 could also be accomplished with a fastener passing through holes 54.

Frame 34 generally includes a top portion 34a and an opposing bottom portion 34b. End bracket portions 34c, 34d on opposite ends of frame 34 include rack mounting holes 28 noted above. End struts 34e are continuous with end bracket portions 34c, 34d. Middle struts 34f extend between top and bottom portions 34a, 34b. Struts 34e, 34f and top and bottom portions 34a, 34b define a linear array of openings for each receiving a connector module 32. Holes 54 of frame 34 are positioned in top and bottom portions 34a, 34b for holding the independently rotatable connector modules 32 about each respective rotation axis 52. The rotation axes 52 extend transversely relative to the linear arrays of connector jacks 30, and also a linear array defined by the plurality of connector modules 32.

A plurality of locking pins 60, and brackets 76 are mounted to frame 34. Each locking pin 60 includes a shaft 62, two spaced apart tabs 64, 66, a first tool engageable end 68, and an opposite end 70. Each tab 64, 66 has two ends extending in opposite directions. End 70 is received in hole 56 in a respective end or middle strut 34e, 34f. Tool engageable end 68 is received in an aperture 80 of bracket 76. Bracket 76 is mounted to top and bottom portions 34a, 34b of frame 34 with two fasteners 82 positioned through apertures 58. Each fastener 82 is received in a hole 78 of bracket 76. Once brackets 76 are mounted to frame 34, locking pin 60 is rotatable between an unlocked position, and a locked position. The locked position is shown in the Figures. The unlocked position is where shaft 62 is rotated 90 degrees about its longitudinal axis, such as with a flathead screwdriver received in tool engageable end 68.

Each connector module 32 includes detents 84, 86 on each end. Lock 40 is constructed wherein tabs 64, 66 are received in detents 84, 86 when connector module 32 is locked in the position shown in FIG. 3. When connector modules 32 are rotated out of plane 36 of frame 34, only one tab 64, 66 is received in one of detents 84, 86. When lock 40 is rotated 90 degrees from the position shown in the Figures, none of tabs 64, 66 are received in any of detents 84, 86 so as to allow free rotation of connector modules 32. Locks 40 associated with middle struts 34f of frame 34 each lock two adjacent connector modules 32.

Figure 15:
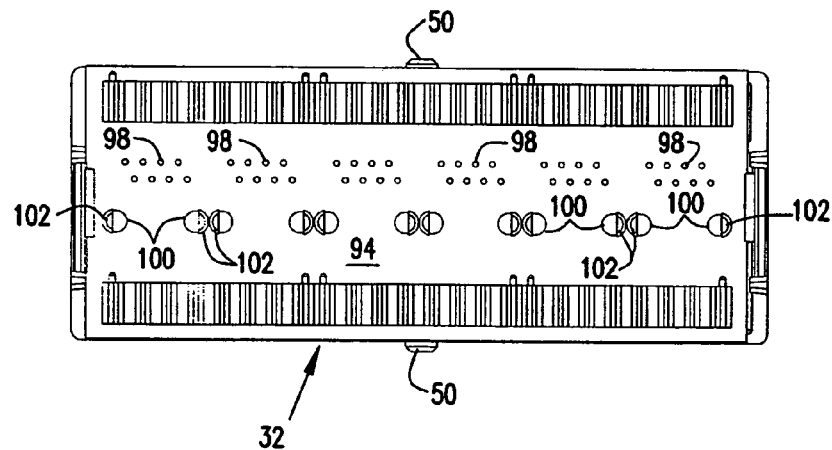
FIG. 15 is a rear view of the connector module of FIG. 11.
Figure 16:
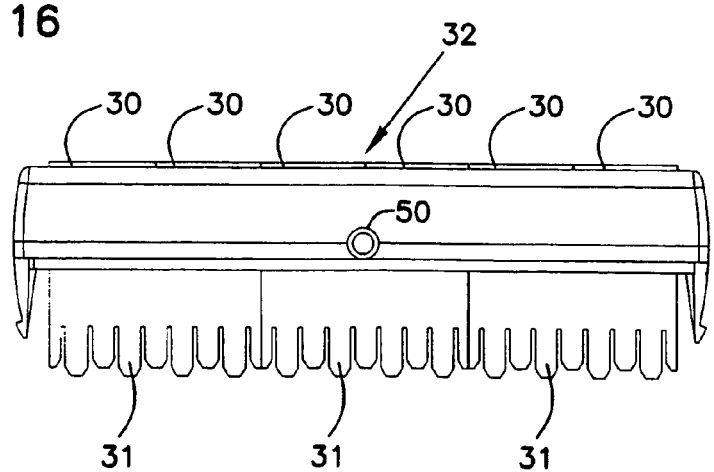
FIG. 16 is a bottom view of the connector module of FIG. 11.

Each connector module 32 includes a circuit module 90 and a face plate 92. Circuit module 90 includes a printed circuit board 94 having a generally planar construction. As shown in FIG. 17, pins 96 of each termination block 31 project through printed circuit board 94 and are soldered to the board. As shown in FIG. 15, connector jacks 30 include pins 98 projecting through printed circuit board 94, and the pins are soldered to the board. Connector jacks 30 also include two tabs 102 which snap mount to printed circuit board 94 through apertures 100 as shown in FIG. 15. Printed circuit board 94 includes circuit pathways to electrically link each connector jack 30 with one of the termination blocks 31. Connector jacks 30 are shown in the Figures with the clip receiving portion of the jack facing vertically downwardly.

Face plate 92 preferably snap mounts to circuit module 90. Opposite ends 110 of face plate 90 include inner snaps 112 for snap fitting engagement of an edge of printed circuit board 94. (See, for example, FIG. 12). Such a construction allows for repair or replacement of circuit module 90 or face plate 92, as desired.

Face plate 92 includes a central opening 108 for exposing connector jacks 30. Face plate 92 further includes outwardly facing stops 114 on each end 110 which limit the amount of rotation of connector module 32 during use. Each stop 114 engages one edge 116 of bracket 76 so as to limit the amount of rotation of connector module to approximately plus or minus 15 degrees in the preferred embodiment. Each face plate includes a front designation strip area 120 for labeling of connector jacks 30.

Examples of connector jacks 30 and termination blocks 31 are shown in U.S. Pat. Nos. 5,700,167; 5,674,093; 5,639,261; 5,591,045; 5,310,363; 5,299,956; and 3,611,264.

The above specification and examples provide a complete description of the manufacture and use of the invention. Since many embodiments of the invention can be made without departing from the spirit and scope of the invention, the invention resides in the claims hereinafter appended.

What is claimed is:

1. A telecommunications patch panel for mounting to a telecommunications rack comprising:

a frame member mountable to the telecommunications rack, the frame member having first and second ends defining a vertical plane when the telecommunications patch panel is mounted to the telecommunications rack, the frame also including a spacer;

first and second horizontal rows of front connector jacks mounted to the frame member on opposite sides of the spacer, the first and second horizontal rows of front connector jacks being aligned generally along the same horizontal plane when the telecommunications patch panel is mounted to the telecommunications rack, the front connector jacks configured and arranged to receive plugs of copper telecommunications cables, each front connector jack connected to a rear connection location, the first horizontal row of front connector jacks positioned between the spacer and the first end of the frame member, the second horizontal row of front connector jacks positioned between the spacer and the second end of the frame member; and the first horizontal row of front connector jacks being aligned along a first horizontal line, the second horizontal row of front connector jacks being aligned along a second horizontal line, and the first and second horizontal lines being angled relative to one another when viewed from above the frame member.

2. The telecommunications patch panel of claim 1, further including first and second brackets adjacent said first and second ends of said frame member.

3. The telecommunications patch panel of claim 1, wherein the horizontal rows of front connector jacks are rotatably mounted to the frame member, and further comprising a lock for selectively locking each horizontal row of front connector jacks to the frame member.

4. The telecommunications patch panel of claim 1, wherein the connector jacks and the corresponding rear connector locations are mounted to the frame via connector modules.

5. The patch panel of claim 1, wherein the first and second horizontal lines define an oblique angle.

6. The patch panel of claim 1, wherein the spacer is generally flat.

7. A telecommunications patch panel for mounting to a telecommunications rack, the patch panel comprising:

a frame adapted for connection to the telecommunications rack, the frame defining at least first and second mounting openings;

a first row of front connectors that mount within the first mounting opening, the first row being generally horizontal when the patch panel is mounted to the telecommunications rack;

a second row of front connectors that mount within the second mounting opening, the second row being generally horizontal when the patch panel is mounted to the telecommunications rack;

the first and second rows of front connectors being aligned generally along the same horizontal plane when the patch panel is mounted to the telecommunications rack; and the first and second rows of front connectors together defining a front connection interface that is generally v-shaped when viewed from above the frame.

8. The patch panel of claim 7, further comprising a first module that carries the first row of front connectors, and a second module that carries the second row of front connectors.

9. The patch panel of claim 7, wherein the front connectors comprise jacks.

10. The patch panel of claim 7, further comprising rear connection locations connected to the first and second rows of front connectors, the rear connection locations defining a rear connection interface that is generally v-shaped when viewed from above the frame.

11. The patch panel of claim 10, wherein a first module carries the first row of front connectors and also carries first rear connection locations connected to the first row of front connectors, and a second module carries the second row of front connectors and also carries second rear connection locations connected to the second row of front connectors.

12. A telecommunications patch panel for mounting to a telecommunications rack, the patch panel comprising:
- a frame adapted for connection to the telecommunications rack, the frame including a first end positioned opposite from a second end, the frame including a first mounting bracket positioned at the first end of the frame and a second mounting bracket positioned at the second end of the frame, the first and second mounting brackets defining a generally vertical plane when the patch panel is mounted to the telecommunications rack;
- a first row of front jacks mounted to the frame, the first row being generally horizontal when the patch panel is mounted to the telecommunications rack;
- a second row of front jacks mounted to the frame, the second row being generally horizontal when the patch panel is mounted to the telecommunications rack;
- the first and second rows of front jacks being aligned generally along the same horizontal plane when the patch panel is mounted to the telecommunications rack; and
- the first and second rows of front jacks being oriented at oblique angles relative to one another and the first and second rows of front jacks together defining a front connection interface that is generally v-shaped when viewed from above the frame.

\* \* \* \* \*